US009230531B2

(12) United States Patent
Roggenkamp et al.

(10) Patent No.: US 9,230,531 B2
(45) Date of Patent: Jan. 5, 2016

(54) ROAD NOISE MASKING IN A VEHICLE

(71) Applicant: GM Global Technology Operations LLC, Detroit, MI (US)

(72) Inventors: Timothy J. Roggenkamp, Brighton, MI (US); Colin M. Hebert, Brighton, MI (US); Scott M. Reilly, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 234 days.

(21) Appl. No.: 13/952,746

(22) Filed: Jul. 29, 2013

(65) Prior Publication Data

US 2015/0030175 A1 Jan. 29, 2015

(51) Int. Cl.

| | |
|---|---|
| ***H04R 3/02*** | (2006.01) |
| ***G10K 11/16*** | (2006.01) |
| ***H04B 1/00*** | (2006.01) |
| ***G10K 11/00*** | (2006.01) |
| ***G10K 11/175*** | (2006.01) |
| *G10K 11/178* | (2006.01) |

(52) U.S. Cl.
CPC ............ *G10K 11/002* (2013.01); *G10K 11/175* (2013.01); *G10K 11/1788* (2013.01); *G10K 2210/128* (2013.01)

(58) Field of Classification Search
None
See application file for complete search history.

(56) References Cited

U.S. PATENT DOCUMENTS

| | | | | |
|---|---|---|---|---|
| 5,204,971 | A * | 4/1993 | Takahashi et al. | 455/185.1 |
| 8,000,480 | B2 * | 8/2011 | Mollon | 381/86 |
| 2008/0188271 | A1 * | 8/2008 | Miyauchi | 455/569.2 |
| 2009/0058633 | A1 * | 3/2009 | Luo et al. | 340/538.12 |
| 2010/0014691 | A1 * | 1/2010 | Moseley et al. | 381/107 |
| 2012/0230504 | A1 * | 9/2012 | Kuroda | 381/71.4 |
| 2012/0269358 | A1 * | 10/2012 | Gee et al. | 381/71.4 |
| 2013/0156213 | A1 * | 6/2013 | Pan et al. | 381/71.4 |

* cited by examiner

*Primary Examiner* — Andrew L Sniezek
(74) *Attorney, Agent, or Firm* — Cantor Colburn LLP

(57) ABSTRACT

Road noise masking for a vehicle includes determining, by a computer processor, an expected interior sound associated with the vehicle. The expected interior sound is defined by a design of the vehicle in conjunction with road conditions encountered by the vehicle. The road noise masking also includes monitoring, via the computer processor, information sources of the vehicle during a driving event. Upon determining a current road surface from the monitoring, the road noise masking includes calculating a masking noise shape commensurate with the expected interior sound, and transmitting instructions including the masking noise shape to an audio system in the vehicle. The audio system produces masking noise from a tuner of the audio system that approximates the masking noise shape.

19 Claims, 3 Drawing Sheets

ROAD NOISE MASKING IN A VEHICLE

FIELD OF THE INVENTION

The subject invention relates to vehicle dynamic performance and, more particularly, to masking road noise in a vehicle through the vehicle's audio system.

BACKGROUND

Vehicle owners are often concerned with undesirable sounds that can be heard in the vehicle interior. One of the sources of undesirable sounds stems from varying road conditions, such as coarse road conditions. Some types of road conditions can negatively impact the operator's overall driving experience by producing unpleasant noise.

When present, unpleasant noise disturbances may be related to a hardware resonance (e.g., through the vehicle's body, suspension, or wheels). Hardware solutions to resolve these disturbances contain multiple challenges that include added cost, mass, and program timing.

Accordingly, it is desirable to provide a cost-effective way to mask undesirable noise produced from various road conditions.

SUMMARY OF THE INVENTION

In one exemplary embodiment of the invention, a method for implementing road noise masking for a vehicle is provided. The method includes determining, via a computer processor in the vehicle, an expected interior sound associated with the vehicle. The expected interior sound is defined by a design of the vehicle in conjunction with road conditions encountered by the vehicle. The method also includes monitoring, via the computer processor, information sources of the vehicle during a driving event. Upon determining a current road surface from the monitoring, the method includes calculating a masking noise shape commensurate with the expected interior sound, and transmitting instructions including the masking noise shape to an audio system in the vehicle, the audio system produces masking noise from a tuner of the audio system that approximates the masking noise shape.

In a further exemplary embodiment of the invention, a system for implementing road noise masking for a vehicle is provided. The system includes a computer processor and logic executable by the computer processor. The logic is configured to implement a method. The method includes determining an expected interior sound associated with the vehicle. The expected interior sound is defined by a design of the vehicle in conjunction with road conditions encountered by the vehicle. The method also includes monitoring information sources of the vehicle during a driving event. Upon determining a current road surface from the monitoring, the method includes calculating a masking noise shape commensurate with the expected interior sound, and transmitting instructions including the masking noise shape to an audio system in the vehicle, the audio system produces masking noise from a tuner of the audio system that approximates the masking noise shape.

In another exemplary embodiment of the invention, a computer program product for implementing road noise masking for a vehicle is provided. The computer program product includes a computer-readable storage medium having program code embodied thereon, which when executed by a computer processor, causes the computer processor to implement a method. The method includes determining an expected interior sound associated with the vehicle. The expected interior sound is defined by a design of the vehicle in conjunction with road conditions encountered by the vehicle. The method also includes monitoring information sources of the vehicle during a driving event. Upon determining a current road surface from the monitoring, the method includes calculating a masking noise shape commensurate with the expected interior sound, and transmitting instructions including the masking noise shape to an audio system in the vehicle, the audio system produces masking noise from a tuner of the audio system that approximates the masking noise shape.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
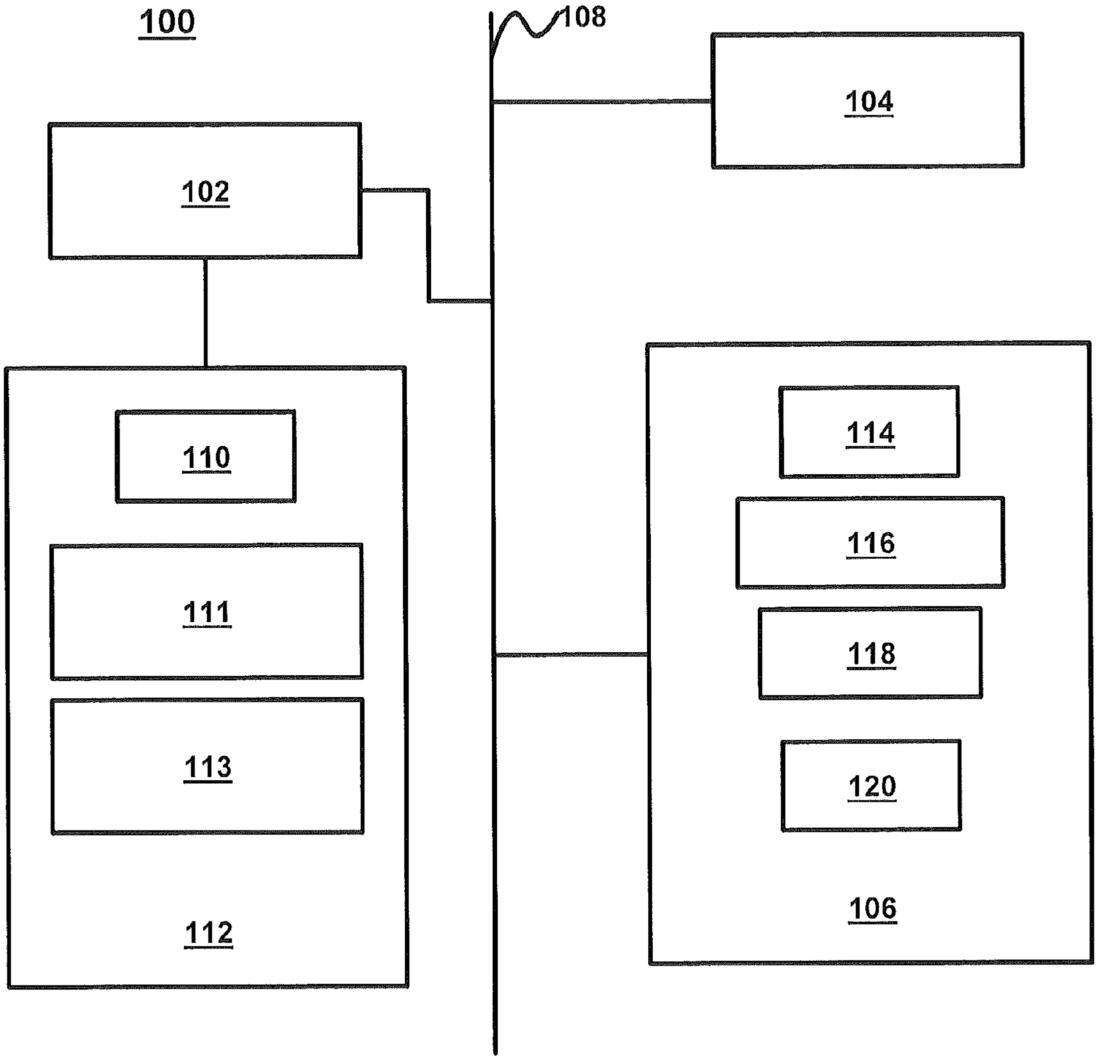
FIG. 1 is a system upon which road noise masking may be implemented in accordance with an exemplary embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, road noise masking for a vehicle is provided. The road noise masking processes determine various road noise conditions and generate a masking sound through the vehicle's audio system sufficient to mask the noise perceived by the vehicle occupant(s) as intrusive or unpleasant. Road noise may be defined as any noise resulting from varying road surfaces and conditions (e.g., dirt roads, grooved surfaces, coarse stone, etc.).

The road noise masking system is configured to generate an amount or frequency of noise that is just sufficient to overcome or mask the sound produced by the road conditions (this sound is referred to as "expected interior sound" as it relates to the sound anticipated or 'expected' inside the vehicle when driving along a particular road surface). The masking noise may be implemented as a shaped broadband noise. By way of non-limiting examples, the shaping of the broadband noise may include one or more of the following parameters: bandpass frequency range, bandpass filter roll off, and the amplitude of the noise.

Turning now to FIG. 1, a vehicle system 100 upon which road noise masking system processes may be implemented will now be described in an exemplary embodiment. The vehicle system 100 includes a computer processor 102, information sources 104, and an audio system 106 communicatively coupled to a vehicle bus 108. In an embodiment, the audio system 106 may be part of an infotainment system.

The vehicle bus 108 may be a high-speed serial data bus, e.g., supported by Controller Area Network (CAN) protocols or other vehicle network. The bus 108 may be implemented using wired and/or wireless technologies known in the art.

In an embodiment, the computer processor 102 may facilitate operations of various components of the vehicle system 100 (e.g., as a command center or central processing center). The computer processor 102 may be part of one of the vehicle system's 100 control systems (e.g., a chassis, engine, and body). The computer processor 102 includes hardware elements (e.g., circuitry, logic cores, registers, etc.) for processing data configured to facilitate operation of the various components of the vehicle, such as those often associated with one of the vehicle's control systems.

The computer processor 102 is communicatively coupled to a memory device 112 that stores vehicle sensitivity information 113, as well as masking logic 110 (also referred to herein as "logic"). The vehicle sensitivity information 113 relates to sound that is perceived inside the vehicle when a particular road surface of interest is encountered. In particular, vehicle sensitivity refers to the vehicle-dependent noise that is produced by vehicle components when various road conditions are encountered. As vehicle model designs and parts can vary greatly from one another, their corresponding vehicle sensitivity information can vary as well. For example, one vehicle model may produce 125 Hz and 210 Hz noise upon encountering coarse road conditions, while another vehicle may produce 105 Hz and 250 Hz noise. The vehicle sensitivity 'signature' for each vehicle design or type is stored in the memory device 112 as the vehicle sensitivity information 113 and is accessed by the logic 110 when road noise is encountered during a driving event, as will be described further herein.

Noises produced by some road surfaces may be more problematic for vehicle occupants than other noises. The road noise masking processes store vehicle sensitivity information 113 of road conditions for which noise masking should be applied, such that the noise perceived by the vehicle occupants as intrusive or unpleasant is masked.

The memory device 112 also stores road translation information 111 that is accessed by the logic 110 to convert sensor data received from the information sources 104 to a known road surface. In an embodiment, various sensor data values associated with the information sources 104 may be mapped to corresponding road surface identifications.

The computer processor 102 communicates with the memory device 112 to implement logic 110 that resides therein. The computer processor 102 also communicates with the audio system 106 over the bus 108 to provide instructions configured to produce masking noise.

In an embodiment, the audio system 106 includes its own computer processor 114 that communicates with various audio system 106 elements, such as one or more speaker(s) 116, an amplifier 118, and a digital signal processing unit 120. The digital signal processing unit 120 receives commands from the logic 110 with instructions for generating a shaped sound to mask the noise conditions identified in the vehicle. The shaped sound is output through the amplifier 118 and, ultimately, the speaker(s) 116. The sound reflects shaped random frequencies and, as a result, it may take on a varying shape (e.g., widely differing frequency levels with peaks and valleys). There may be many different sound shapes generated, each of which corresponds to the noise produced by differing road conditions (e.g., based on the notion that variances in road conditions will affect the noise produced therefrom). A sample graphical depiction of a shaped sound and associated narrow-band noise frequency shape is described further in FIG. 3.

The audio system 106 may include other components, such as a deck, tuner, and other audio system devices, in addition to the speaker(s) 116, amplifier 118, and digital signal processing unit 120 described above. Components of the audio system 106 may be disposed, at least in part, in or near the cabin of the vehicle or in any location that facilitates execution of the road noise masking processes, such that they introduce vehicle sounds that the vehicle occupant will appreciate based upon the current road noise conditions and associated noise.

As indicated above, the vehicle sensitivity information 113 is vehicle dependent and differs from one vehicle to the next based on vehicle design factors. For example, one vehicle model may produce 125 Hz and 210 Hz noise upon encountering coarse road conditions, while another vehicle may produce 105 Hz and 250 Hz noise. The vehicle sensitivity 'signature' for each vehicle design or type is stored in the memory device 112 and accessed by the logic 110 when road noise is encountered during a driving event, as will be described further herein.

The computer processor 102 monitors various conditions through the information sources 104. The information sources 104 may include various sensor devices and electronic control units that receive data that may determine or indicate current road conditions. In particular, the computer processor 102 identifies when specific road conditions have been encountered from the data received from the information sources 104. By way of non-limiting example, data indicative of a road condition may come from a combination of wheel speed rotation sensors, magneto-rheological suspension position sensors, an acceleration in the Z direction, an accelerometer mounted in the front corner of the vehicle, and components of safety initiatives used in autonomous driving systems, to name a few. Other sources of information associated, e.g., with the chassis control system of the vehicle, may be used as the sources of information as well.

Figure 2:
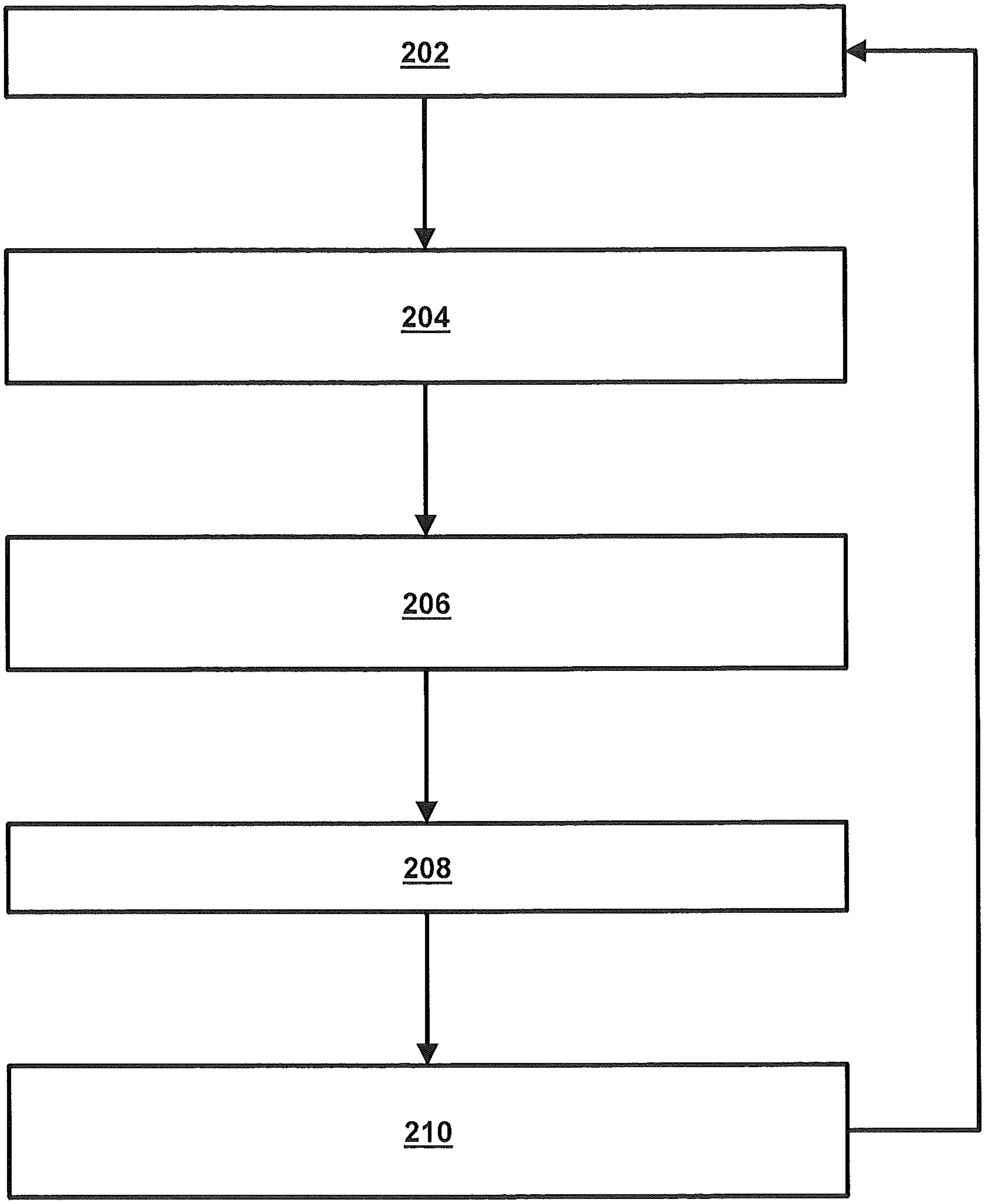
FIG. 2 is a flow diagram describing a process for masking road noise in accordance with an exemplary embodiment.

Turning now to FIG. 2, a process for implementing the road noise masking will now be described in an embodiment. The process described in FIG. 2 assumes that an individual is engaged in driving the vehicle of the vehicle system 100.

At step 202, the processor 102 monitors data received from the information sources 104. For example, the processor 102 may monitor vehicle wheel speed data from wheel speed rotation sensors, and position data from a magneto-rheological position sensor.

At step 204, the processor 102 accesses the road translation information 111 in the memory device 112 to determine the road surface based on the data received from the information sources 104. In an embodiment, various sensor data values associated with the information sources 104 may be mapped to corresponding road surfaces.

At step 206, the processor 102 accesses the vehicle sensitivity information 113 from the memory device 112.

At step 208, the processor 102 utilizes the road translation information from step 204, the vehicle sensitivity information from step 206, and the logic 110 to calculate the appropriate masking shape. It will be understood that the calculated masking shape can be zero (e.g., no sound should be added if the road noise is not unpleasant). In an embodiment, frequencies and decibel levels are determined in calculating the masking shape (an example of this is shown, e.g., in FIG. 3).

At step 210, the information of the masking frequency shape is transmitted by the processor 102 over the bus 108 to the audio system 106. The audio system 106 produces the noise indicated in the masking frequency shape and presents it through the speakers 116 to the interior cabin of the vehicle.

The processor 102 continues to monitor the information sources at step 202 until the completion of the driving event.

Figure 3:
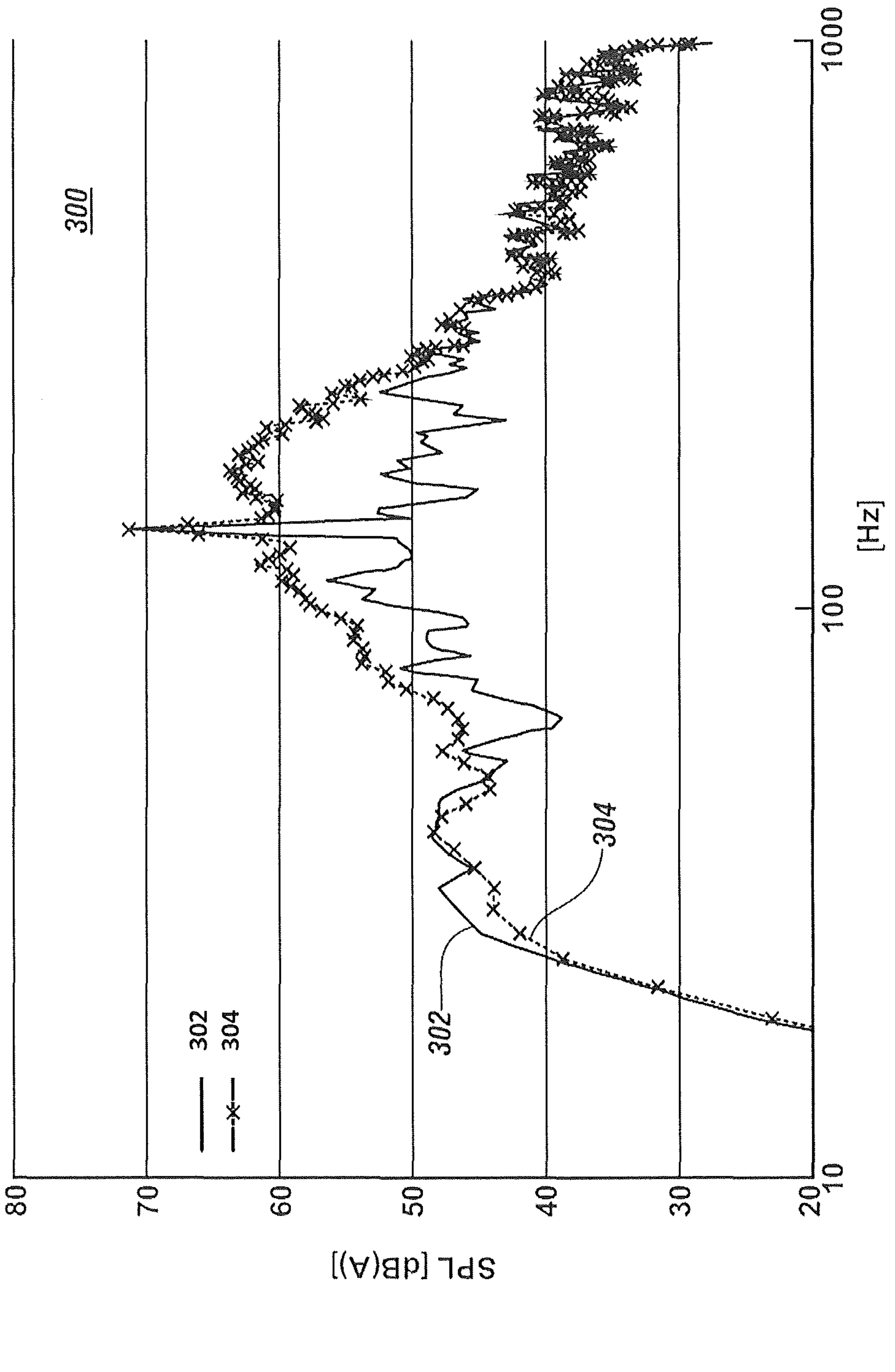
FIG. 3 is a graphic illustration of a shaped sound overlaid on a narrow-band noise frequency in accordance with an exemplary embodiment.

As shown in FIG. 3, a graphical depiction 300 illustrates a noise shape indicating an unpleasant sound 302 perceived from the current road surface. After masking noise is calculated and added through the audio system, the resulting more pleasant sound 304 is shown. Technical effects of the invention include road noise masking for a vehicle that determines road noise conditions and generates a masking sound through the vehicle's audio system to mask the noise perceived by the vehicle occupant(s) as intrusive or unpleasant. The road noise masking system generates an amount of noise that is just sufficient to overcome or mask the noise produced by the road conditions.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A method for implementing road noise masking for a vehicle, the method comprising:

determining, via a computer processor in the vehicle, an expected interior sound associated with the vehicle, the expected interior sound defined by a design of the vehicle in conjunction with road conditions encountered by the vehicle and vehicle sensitivity information that relates to sound perceived inside the vehicle when a particular road surface of interest is encountered;

monitoring, via the computer processor, information sources of the vehicle during a driving event to determine a current road surface by:

accessing road translation information based on vehicle wheel speed data from wheel speed rotation sensors of the vehicle and position data from a magneto-rheological suspension position sensor of the vehicle, and identifying the current road surface corresponding to the road translation information; and upon determining a current road surface is the particular road surface of interest from the monitoring:

calculating a masking noise shape commensurate with the expected interior sound, and transmitting instructions including the masking noise shape to an audio system in the vehicle, the audio system producing masking noise from a tuner of the audio system that approximates the masking noise shape.

2. The method of claim 1, wherein parameters applied in the calculating of the masking noise shape include at least one of: bandpass frequency range, bandpass filter roll off, and amplitude of masking noise.

3. The method of claim 1, wherein the information sources include components managed by at least one control system of the vehicle.

4. The method of claim 1, wherein the information sources are characterized by at least one of:

a wheel speed sensor;

the magneto-rheological suspension position sensor;

an accelerometer; and a safety component sensor of an autonomous driving component.

5. The method of claim 1, wherein the expected sound is generated when tires of the vehicle traverse a road.

6. The method of claim 1, wherein the expected sound is produced by vibrations transmitted through a body and mounts of the vehicle.

7. The method of claim 1, wherein the expected sound is produced from sound radiated at a tire to road interface.

8. The method of claim 1, wherein the expected interior sound comprises any sound resulting from varying road surfaces.

9. A system for implementing road noise masking for a vehicle, the system comprising:

a computer processor disposed in the vehicle and communicatively coupled to a vehicle bus; and logic executable by the computer processor, the logic configured to implement a method, the method comprising:

determining an expected interior sound associated with the vehicle, the expected interior sound defined by a design of the vehicle in conjunction with road conditions encountered by the vehicle and vehicle sensitivity information that relates to sound perceived inside the vehicle when a particular road surface of interest is encountered;

monitoring, over the vehicle bus, information sources of the vehicle during a driving event to determine a current road surface by:

accessing road translation information based on vehicle wheel speed data from wheel speed rotation sensors of the vehicle and position data from a magneto-rheological suspension position sensor of the vehicle, and identifying the current road surface corresponding to the road translation information; and upon determining a current road surface is the particular road surface of interest from the monitoring:

calculating, and a masking noise shape commensurate with the expected interior sound transmitting instructions including the masking noise shape to an audio system in the vehicle, the audio system producing masking noise from a tuner of the audio system that approximates the masking noise shape.

10. The system of claim 9, wherein parameters applied in the calculating the masking noise shape include at least one of: bandpass frequency range, bandpass filter roll off, and amplitude of masking noise.

11. The system of claim 9, wherein the information sources include components managed by at least one control system of the vehicle.

12. The system of claim 9, wherein the information sources are characterized by at least one of:

a wheel speed sensor;

the magneto-rheological suspension position sensor;

an accelerometer; and a safety component sensor of an autonomous driving component.

13. The system of claim 9, wherein the expected sound is generated when tires of the vehicle traverse a road.

14. The system of claim 9, wherein the expected sound is produced by vibrations transmitted through a body and mounts of the vehicle.

15. The system of claim 9, wherein the expected sound is produced from sound radiated at a tire to road interface.

16. The system of claim 9, wherein the expected interior sound comprises any sound resulting from varying road surfaces.

17. A computer program product for implementing road noise masking for a vehicle, the computer program product comprising a non-transitory computer-readable storage medium having program code embedded thereon, which when executed by a computer processor, causes the computer processor to implement a method, the method comprising:

determining, via a computer processor in the vehicle, an expected interior sound associated with the vehicle, the expected interior sound defined by a design of the vehicle in conjunction with road conditions encountered by the vehicle and vehicle sensitivity information that relates to sound perceived inside the vehicle when a particular road surface of interest is encountered;

monitoring, via the computer processor, information sources of the vehicle during a driving event to determine a current road surface by:

accessing road translation information based on vehicle wheel speed data from wheel speed rotation sensors of the vehicle and position data from a magneto-rheological suspension position sensor of the vehicle, and identifying the current road surface corresponding to the road translation information; and upon determining a current road surface is the particular road surface of interest from the monitoring:

calculating a masking noise shape commensurate with the expected interior sound, and transmitting instructions including the masking noise shape to an audio system in the vehicle, the audio system producing masking noise from a tuner of the audio system that approximates the masking noise shape.

18. The computer program product of claim 17, wherein the information sources are characterized by at least one of:

a wheel speed sensor;

the magneto-rheological suspension position sensor;

an accelerometer; and a safety component sensor of an autonomous driving component.

19. The computer program product of claim 17, wherein the expected sound is generated by at least one of:

tires of the vehicle traversing a road;

vibrations transmitted through a body and mounts of the vehicle; and sound radiated at a tire to road interface.

* * * * *